United States Patent [11] 3,593,815

[72] Inventor Kiyoshi Inoue
 No. 16-8 3-chome, Kamiyoga, Setagaya-ku, Tokyo, Japan
[21] Appl. No. 765,540
[22] Filed Oct. 7, 1968
[45] Patented July 20, 1971

[54] SYSTEM FOR AUTOMATICALLY OPERATING PARKING BRAKE FOR AUTOMOBILES
10 Claims, 8 Drawing Figs.

[52] U.S. Cl. .................................................. 180/82, 192/3, 188/110
[51] Int. Cl. ................................................... B60f 7/12
[50] Field of Search .................................... 192/3, 3 H, 3 TR; 315/79; 180/82, 103; 188/110, 265

[56] References Cited
UNITED STATES PATENTS

| | | | |
|---|---|---|---|
| 2,235,412 | 3/1941 | Weiss et al. | 192/3 |
| 2,308,822 | 1/1943 | Murphy | 192/3 |
| 2,734,590 | 2/1956 | Hays | 188/265 X |
| 2,849,557 | 8/1958 | Long | 192/3 |
| 2,938,611 | 5/1960 | Cooke | 192/3 |
| 2,990,903 | 7/1961 | Stingel et al. | 188/110 X |
| 3,233,153 | 1/1966 | Ryan | 180/82 X |

Primary Examiner—Kenneth H. Betts
Attorney—Owen, Wickersham and Erickson

ABSTRACT: A system for automatically actuating and deactuating a parking brake for an acceleratable engine-driven vehicle whereby use is made of a "go" signal representing a vehicle operating mode, in which the vehicle is permitted to move or the vehicle is actually in movement, and a "stop" signal representing another mode in which the vehicle is brought to a stop or is stationary. A logic unit responds to these signals, discriminating between the corresponding modes, and transmits a control signal to a brake controller circuit.

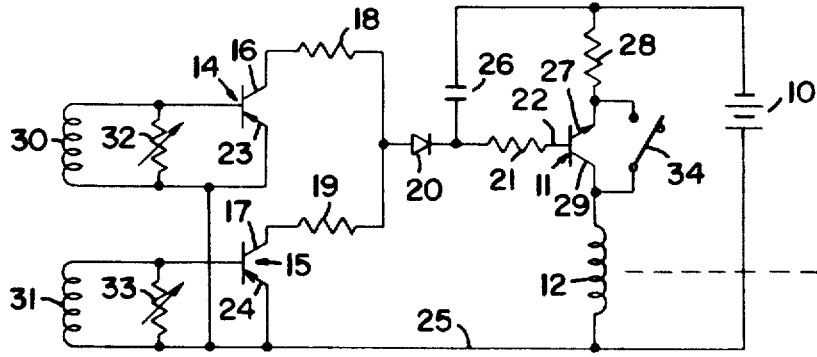
FIG_1
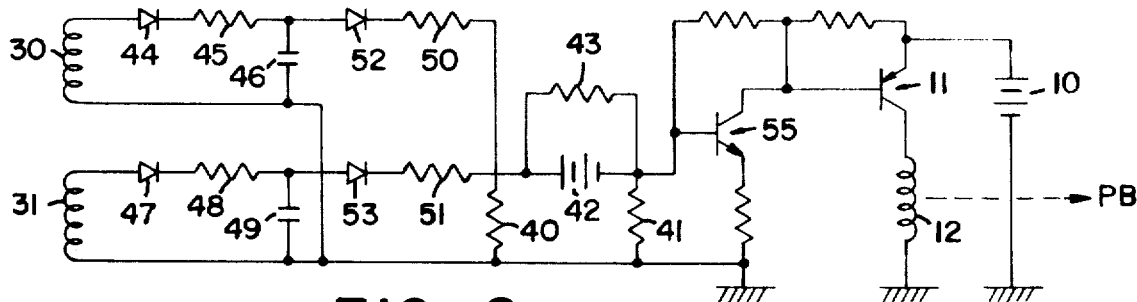
FIG_2
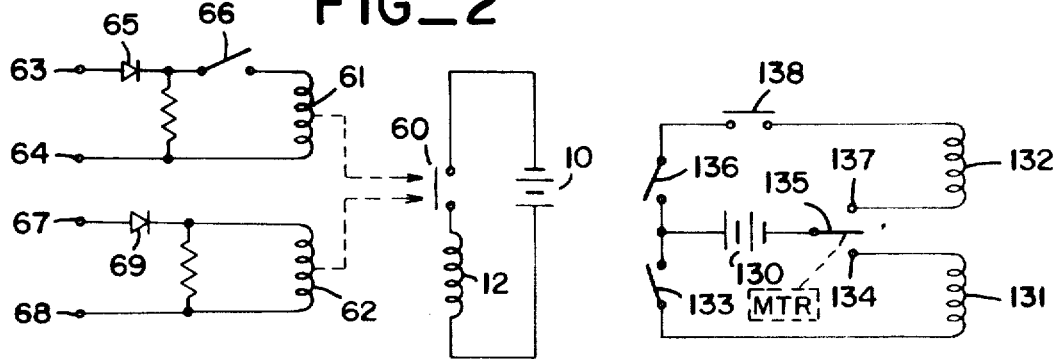
FIG_3    FIG_6
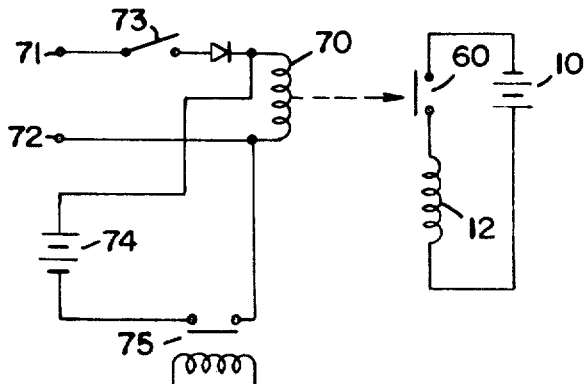
FIG_4
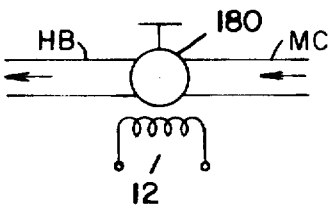
FIG_8
INVENTOR.
KIYOSHI INOUE
BY
Owen, Wickersham & Erickson
ATTORNEYS

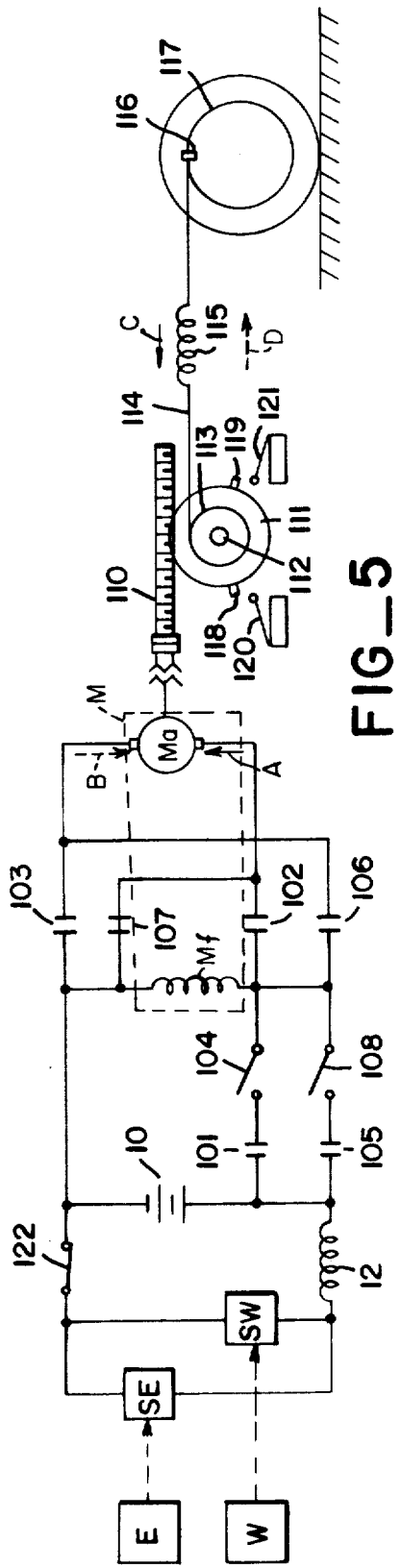
FIG_5
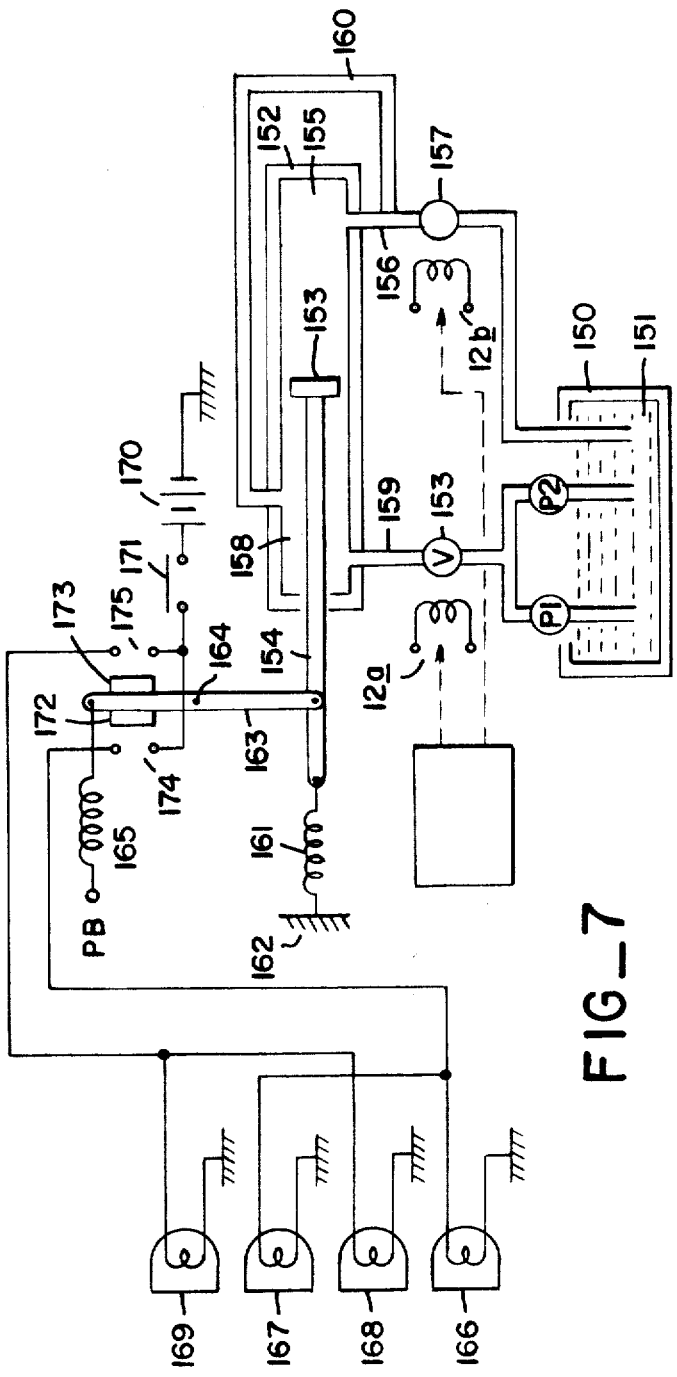
FIG_7
INVENTOR.
KIYOSHI INOUE
ATTORNEYS

SYSTEM FOR AUTOMATICALLY OPERATING PARKING BRAKE FOR AUTOMOBILES

This invention relates to a brake control system for motor vehicles and, more particularly, to a system for automatically operating a parking brake for engine driven automobiles, commonly also called a safety brake, hand brake, side brake or emergency brake. The invention also relates to a method of operating parking brakes.

In automobiles, it is common practice, for safety, to employ in addition to a service or foot brake system, a parking brake system in which the brake is activated and deactivated by driver's muscular effort every time it is set or released. Not only is such procedure a nuisance but also it does require considerable force and skill and consistent attention by drivers for vehicle safety and maintenance. Inadvertent starting of a car, for example, without unlocking the parking brake causes burning of the brake linings, while leaving car without setting the parking brake in position often results in the car accidentally moving and causing injury and property damage. Furthermore, manipulation in starting at a hill after a temporary stop has considerably bothered many motorists, inasmuch as reliance is made to such a hand operated (or part-hand, part-foot) parking brake.

It is, therefore, the object of the present invention to provide an automatically operated parking brake whereby the physical and mental strain hitherto unavoidably placed on motorists in operating the parking brake are eliminated.

It is another important object of the invention to provide a safe and reliable automatically controllable parking brake system which can readily, easily, and inexpensively be installed in existing automobiles.

These and other objects of the invention will be apparent as the following description proceeds.

My present invention in essence resides in an automatically released and automatically actuated parking brake for engine-driven vehicles whereby use is made of a "go" signal indicating a vehicle operating mode in which the vehicle is permitted to start or the vehicle is actually in movement and a "stop" signal indicative of another mode in which the vehicle is brought to a stop or is stationary. According to a significant feature of this invention, a logic unit which consistently responds to modes of vehicle conditions, transmits these signals to a parking brake controller to govern the actuation and deactuation of the brake. Thus, the parking brake is automatically deactivated upon the "go" signal becoming effective, and it is held deactivated as long as the vehicle is in movement, despite its speed being from time to time controlled during the movement through a service brake system, whereas the parking brake becomes activated upon receipt of the "stop" signal and is held activated as long as the vehicle is stationary until another "go" signal is received from the logic unit. A more specific feature of the invention is that the "go" signal is initiated through a driver's action of accelerating an engine as necessary to bring the vehicle into drive, e.g. at the instant a gas pedal is applied, and then is held effective responsive to the movement of the vehicle. Conveniently, a dynamo can be used effectively to serve the "go" signal initiating generator by making an arrangement such that when the engine gear is shifted for an intended vehicle start, the dynamo output is effective to release the control of the parking brake. On the other hand, it is convenient to use the wheel rotation as a signal which is indicative of the vehicle movement to retain the "go" signal, thereby keeping the parking brake deactivated until the vehicle is stopped. When the vehicle is brought to a stop by the application of the service brake, the parking brake is activated automatically through the operation of the logic unit which then transmits to the brake controller the "stop" signal, indicating the mode or condition that the vehicle is stationary and that the engine is not being accelerated.

The above and other novel features and advantages of the present invention will more readily become apparent from the following description when read in conjunction with the accompanying drawings wherein like references numerals are used to designate like parts and wherein:

FIG. 1 is a circuit diagram illustrating one form of a logic-controlled, automatic parking brake operating system embodying the principles of the present invention and using a pair of transistors as the logic unit and a switching transistor as the brake control governor.

FIG. 2 is a circuit diagram of a modification of the system of FIG. 1.

FIG. 3 is a circuit diagram of modified form of my invention, using electromagnetic relays for logic and control governors.

FIG. 4 is a circuit diagram of another modified form of the invention, also using electrical relays for logic and control governors.

FIG. 5 is a diagrammatic showing of an automatic parking brake controller embodying the principles of the invention and incorporating an electric motor arrangement as a brake applicator.

FIG. 6 is a simplified circuit diagram illustrating another modification.

FIG. 7 is a diagrammatic showing of another form of automatic brake controller, utilizing a hydraulic arrangement and incorporating a lighting system adapted to automatically extinguish the head lights and light some spot lights or parking lights upon parking.

FIG. 8 is a diagrammatic showing of an electromagnetic valve for brake automatically controlled by systems of FIGS. 1—4.

Referring now to FIG. 1, I show a direct-current source 10, an NPN transistor 11, and a coil 12, connected in series to provide a parking brake controller embodying the principles of my invention. When the coil 12 is energized, it releases a parking brake, diagrammatically shown as PB; and when the coil 12 is deenergized, it actuates the brake PB through a hydraulic or mechanical arrangement such as is later described (see FIGS. 5 and 7). The energization and deenergization of this coil 12 by the DC source 10, which may be common to a battery equipped in the automobile, is governed by the transistor 11, which acts as a switch and, in turn, is controlled, in accordance with the principles of the invention, by a logic unit, here shown as a pair of PNP transistors 14 and 15, whose respective collector electrodes 16 and 17 both are connected, preferably through resistors 18 and 19 and via a diode 20 and resistor 21 with the base electrode 22 of the transistor 11. The transistors 14 and 15 have their respective emitter electrodes 23 and 24 connected to a lead 25 which connects the coil 12 with the positive terminal of the battery 10. The negative terminal of the battery 10 may be connected to the transistor base 22 through a capacitor 26 and the resistor 21, and it may also be connected to the emitter electrode 27 of the transistor 11 through a resistor 28. The collector 29 is connected to the coil 12. From this construction, it will be appreciated that the transistor-switch 11 is closed for energization of the coil 12 when either of transistors 14 and 15 is rendered conductive, and it is opened to deenergize the coil 12 only when both of these PNP transistors 14 and 15 are rendered nonconductive. Emitter-base circuits of these logic transistors are provided with sensing coils 30 and 31, as shown, with respective resistors 32 and 33 shunting these coils.

In the instant embodiment, the sensing coil 30 responds to the operation of the engine and, to this end, may be a tachometer coupled with the engine, such that it can receive a signal substantially proportional in magnitude to the operating speed of the engine. By properly adjusting the number of turns of the coil 30 and the value of the shunt resistor 32, the transistor 14 may be rendered conductive when the engine speed exceeds a predetermined level, for example, when the engine exceeds an idling speed in standard automobiles, as an indication that the vehicle is to be permitted to start upon the application of gas pedal. As long as the engine speed is in excess of this level, the transistor 30 remains conductive, to hold the transistor switch 11 closed, thereby continuing to deactivate the parking brake PB.

On the other hand, the sensing coil 31 responds to the movement of the vehicle, and, for this purpose, may be a pickup of a ground speed meter or get its signal directly from an axle. The emitter-base circuit of the transistor 15 can be adjusted to be adequate for the transmission of an input signal such that the transistor 15 is made conductive immediately upon movement of the vehicle or when the speed is in excess of a predetermined level, say, above 1 to 3 meters per second; and the transistor 15 is made nonconductive when the vehicle returns to a complete stop or when its speed drops below a predetermined very slow speed.

In the "go" mode, in which the vehicle is in accelerated motion, both the transistors 14 and 15 are conductive to cause the "go" signal to be transmitted continuously to the transistor 11, so that the control coil 12 keeps the parking brake PB deactivated. When the engine is decelerated for an intended stop or for speed control, the transistor 14 is made nonconductive, but the transistor 15 remains conductive, thereby retaining the "go" signal to the transistor-switch 11. As will be apparent, the actuation of parking brake is effected upon a return to nonconduction of both of the transistors 14 and 15 or in other words, upon return of the logic unit to the "stop" mode.

Connected in shunt across the base and emitter electrodes 21 and 27 of the transistor 11, the capacitor 26 functions to delay temporarily the transfer of the transistor 11 from conductive into nonconductive state upon termination of logic signals and, hence, to delay temporarily the actuation of brake PB. In shunt across the emitter and collector electrodes 29 of the transistor 11, I provide a normally open, manual, changeover switch 34 so that the system can also be operated manually, i.e. by shunting the transistor 11 by this switch 34.

In FIG. 2, I provide a modification wherein the logic unit comprises a resistor 40, a resistor 41, and a battery 42 shunted by a resistor 43. The sensing coil 30 again receives a signal proportional to the operating rate of engine, whereas the sensing coil 31 receives a signal proportional to vehicle speed. These sensed signals are applied across the common resistor 40 via respective integrating networks comprising, for the sensing coil 30, a diode 44, a resistor 45 and a capacitor 46, and, for the sensing coil 31, a diode 47, a resistor 48, and a capacitor 49. Resistors 50 and 51 determine the discharge time constants of capacitors 46 and 49, respectively. Diodes 52 and 53 block the current from battery 42 into these sensing circuits. The brake controller includes the battery 10, the transistor-switch 11, and the coil 12, as in FIG. 1. A transistor 55 serves as an amplifier of the logic signal generated across the resistor 41 and to be transmitted to the transistor-switch 11.

Under the above basic construction, the system is designed such that in an idling condition and where the vehicle is stationary, a voltage impressed across the sensing resistor 40 by the engine operating rate sensing circuit is counterbalanced against the voltage of the logic battery 42, so that no signal appears across the logic output resistor 41, thereby holding the amplifier transistor 55 and the switching transistor 11 nonconductive. Upon the acceleration of the engine, an increased voltage will emerge after a time delay across the resistor 40 and overcome the logic voltage of the battery 42, rendering the transistors 55 and 11 conductive. At this stage, the parking brake PB is deactivated. When the vehicle is permitted to move after the acceleration of engine, the sensing coil 31 is energized, impressing across the integrating capacitor 49 a voltage proportional in magnitude to the vehicle speed. The circuit parameters of this vehicle-motion sensor are adjusted such that even if the sensing coil 30 indicates the deceleration of engine, the voltage from the capacitor 49, and hence upon the resistor 40, is effective to overcome the logic voltage 42, inasmuch as the vehicle speed does not drop to null or below substantially low value, so that the parking brake PB is kept released. Thus, it is not until the vehicle is brought into a stop that the parking brake becomes actuated. The resistors 50 and 51 associated with the respective capacitors 46 and 49 are provided to function as time delays, so that there is a delay before each of the vehicle run signals, and the engine acceleration signal is ineffective upon the brake controller.

In FIG. 2, there is shown a modification wherein the switch governing the energization of the control coil 12 is a relay switch 60 operated by a pair of energizing coils 61 and 62 responding to the acceleration of engine and movement of the vehicle, respectively, and functioning as a logic unit like that served by a pair of transistors 14 and 15 in the embodiment of FIG. 1. Thus, when either of these coils 61 or 62 is energized, the relay contacts 60 are designed to close for energization of the brake control coil 12 by the battery 10.

The relay coil 61 is here energized by a dynamo (not shown) connected with the input side of terminals 63 and 64, via a rectifying diode 65 when a switch 66 is closed in response to an indication that the engine is accelerated to permit the vehicle to drive. This switch 66 can be a transistor or other electronic switch whose conduction and nonconduction are controlled by the signal received by a tachometer sensing coil 30, as in the case of FIG. 1 but may simply be a mechanical switch associated with an engine accelerating system and designed to close, for example, when the gas pedal is pushed down even slightly. It is, of course, convenient to incorporate in series with the switch 66 and the relay coil 61 an auxiliary switch, for example, designed to close when the clutch pedal is released or the gear change lever is shifted from its neutral position, so that the relay coil 61 is properly energized only when the closure of switch 66 is for an intended start, avoiding any premature energization.

The relay coil 62, equivalent in function for logic to the transistor 15 of FIG. 1, responds, here too, to the movement of vehicle and is energized from terminals 67 and 68 via a rectifying diode 69, once the vehicle is brought into a movement.

In FIG. 4, there is shown another modification wherein a single relay coil 70 is used which is energizable both by signals indicative of the acceleration of engine and the movement of vehicle. In this embodiment, the first signal for the energization of the relay coil 70 is generated from dynamo terminals 71 and 72 when an engine acceleration-indicating switch 73 as described in the preceding system is closed, whereas the second energization signal is generated from a battery 74 when relay contacts 75 are made in response to a vehicle movement-indicating current signal which passes through a relay coil 76. (The latter may be the relay coil 62 of FIG. 3 system.) The battery 74 may of course be common to battery 10 for energization of the brake control coil 12.

In connection with a specific brake applicator through the use of an electric motor arrangement, FIG. 5 illustrates how the automatic actuation and deactuation of the parking brake may be carried out. In the illustration, the control coil 12 is shown as a relay coil which is energizable by the battery 10 when either of logic switches SE or SW is closed, responding to the engine acceleration and the vehicle displacement, respectively, as mentioned earlier. The battery 10 is shown as being connectable with the armature $M_a$ of an electric motor M via normally closed relay contacts 101, 102, and 103 and a limit switch 104 and also being connectable with the armature with the reverse polarity via normally open contacts 105, 106, and 107 and a limit switch 108. The field coil $M_f$ of the motor M is shown as being energized when either of the limit switches 104 or 108 is closed. The rotor of the motor M is connected with a worm shaft 110, with which in turn worm gear 111 is engaged rotatably about its axis 112. The worm gear 111 has a pulley 113 on which is wound a wire 114 fixed via a spring 115 with a brake actuator, such as a cam 116 for an externally contracting or internally expanding brake 117. This brake may be either a wheel or center brake. The worm gear 111 is also provided with a pair of dogs 118 and 119 fixed on its periphery and respectively engageable with a pair of leaf springs 120 and 121 of the limit switches 104 and 108 whose function is described below.

With the vehicle's engine E in an idling operation and the vehicle's wheels W stationary, the corresponding logic switches SE and SW (which may be various embodiments, as shown in FIGS. 1—4) are both inactive and do not energize the relay coil 12. In this situation, current from the battery 10 flows through the normally closed contacts 101, the limit switch 104 and the motor field coil M$f$ back to the negative terminal and, also from the limit switch 104 through closed contacts 102, the motor armature M$a$ in the direction of solid arrow a, and the closed contacts 103 back to the negative terminal of the battery 10. Consequently, the motor M is rotated to cause the worm gear 111 to rotate so that the wire 114 is wound up in the direction of solid arrow C by the pulley 113 to actuate the brake 117 through the cam 116 fixed at the end of the wire 114. As the worm gear 111 is rotated, one of the dogs 118 fixed on its periphery is brought into actuating contact with the spring leaf 120, thereby immediately opening the limit switch 104. When this occurs, the motor field M$f$ and armature M$a$ both are isolated from the battery 10, and the motor M becomes stationary holding the brake 117 is position.

When the engine operation is accelerated to start the vehicle, the logic switch SE is closed to energize the relay coil 12 by the battery 10. The energization of the relay coil 12 immediately closes the normally open contacts 105, 106, and 107 and opens the normally closed contacts 101, 102, and 103, with the result that battery current flows from its positive terminal through the contacts 105, the limit switch 108, and the field coil M$f$ back to the negative terminal of the battery 10 and, from the limit switch 108, through the contacts 106, motor armature M$a$ along dotted arrow B and contacts 107 back to the negative terminal. In this case, the motor rotation is such that the worm gear (in is revolved clockwise to release the wound-up wire 114, (in the direction of solid arrow D) thereby deactuating the brake 117. The worm gear 111 is revolved until the dog 119 knocks on the spring leaf 121 to cut off the limit switch 108, when the motor M is deenergized to maintain the brake 117 in an unlocked condition.

During the period of vehicle displacement, the logic switch SW is always effective to energize the relay coil 12 and hence keep the contacts 101, 102 and 103 open, even though the logic switch SE becomes ineffective as a result of engine deceleration, and accordingly, there will be no change from the last-mentioned condition. When the vehicle is brought to a stop, the first-mentioned condition is restored.

As an optional control, a normally closed switch 112 may be provided in series with the battery 10 and the relay coil 12, as shown, for emergency purpose in case of trouble with the service brake system. By opening this switch 122 even during movement of the vehicle, the parking brake is promptly actuated, since the relay coil 12 is then isolated from the battery 10. Advantageously, this switch 122 can be a mechanical switch that is designed to close automatically upon pushing down the foot brake pedal to its extreme, as during an emergency.

In FIG. 6, I provide a further modification of the control circuit for the parking brake applicator mechanism, e.g. by relay controlled electric motor arrangement of the type shown in FIG. 5. In the instant embodiment, a battery 130 is shown to energize a pair of relay coils 131 and 132; the coil 131, when energized, is adapted to deactuate the parking brake, while the relay coil 132, when energized, actuates the parking brake. The relay coil 131 is energized under the closure of a limit switch 133 and when a contact 134 is made by a single-pole double two-throw switch 135, actuated by a relay MTR that responds to the acceleration of engine, whereas the relay coil 132 is energized under the closure of a limit switch 136 and when a contact 137 of the relay MTR is made by the switch arm 135 and a switch 138 is closed, the latter being governed by a vehicle-motion-indicating logic circuit, such as any of those described above. At this point, it should be noted that the system is designed so that when the engine is accelerated to the extent which permits the vehicle to start, the contact 134 of the relay MTR is closed in response to the indication signals aforementioned; otherwise, the contact 137 is closed. In addition, the motion-responsive switch 138 is adapted to close when the vehicle is stationary and to open when the vehicle is in movement.

With the above in mind, it will be recognized that when the vehicle is stationary with the engine not yet accelerated or at rest, the relay coil 132 is energized through the battery 130, owing to the closure of the contact 137, the signal switch 138, and the limit switch 136, and the coil 132 immediately causes the brake applicator mechanism to actuate the parking brake in the manner described in the embodiment of FIG. 5. Upon attainment of a given limit of this brake actuation, the limit switch 136 is opened, leaving the brake locked while isolating the relay coil 132 from the battery 130. When the engine acceleration is effected, the contact 134 of the relay MTR then is made to energize the coil 131 from the battery 130 through the limit switch 133. This promptly deactuates the parking brake through the inverse operation of the brake applicator mechanism. The limit switch 132 is opened to isolate the coil 131 from the battery 130 while closing the limit switch 136.

Once the vehicle is brought into movement, the signal switch 138 is opened by responding to this indicating signal. Therefore, it will be apparent that the deceleration of engine, i.e. closing the contact 137, does not let the relay coil 131 be energized during vehicle movement. The energization of the relay coil 132, i.e. actuation of brake, is effected only when the switch 138 is closed, indicating the stopping of vehicle and the contact 137 is closed as a result of engine deceleration.

FIG. 7 includes a hydraulic system for automatically releasing and locking the parking brake in response to one of the controller circuits mentioned earlier. The hydraulic system comprises a sump 150 for which use may conveniently be made of the automobile crank case containing a lubricating oil 151. The oil is drawn by a pair of pumps P1 and P2 and led into a cylinder unit 152 through an electromagnetic (or solenoid) valve 153, which is controlled by a coil 12$a$ connected to a logic circuit, which may be any of those disclosed in FIGS. 1 to 4, or others. In cylinder unit 152 is a cylinder 153 with a rod 154. A right-hand chamber 155 of the cylinder 152 is provided with an outlet pipe 156 that communicates with the sump 150 via an electromagnetic (e.g. solenoid) valve 157 controlled by an output coil 12$b$ of the logic unit. A left-hand chamber 158 of the cylinder 152, which receives the pressurized oil via an input pipe 159, has a return pipe 160 which communicates with the output pipe 156. The piston rod 154 at its extreme opposite to the piston 153 is connected to a spring 161 attached to a fixed site 162. Intermediate its ends, the piston rod 154 is pivoted to one end of a brake rod 163, which is pivotally mounted on a fixed support 164. The other end of the brake rod 163 is secured to a spring wire 165, the expansion and contraction of which actuates and deactuates the parking brake.

When no signal is generated at the output of the logic unit, i.e. across either the coil 12$a$ or the coil 12$b$, as when the vehicle is stationary and the engine not accelerated above idle, both of the valves 153 and 157 are closed and the piston 153 is urged to its left-hand extreme position by the tension of the spring 161. This causes the brake spring 165 to be expanded, so that the brake PB may properly be locked. Upon acceleration of the engine, the coils 12$a$ and 12$b$ are energized and promptly open the values 153 and 157, respectively, and then the pressurized oil from the pumps P1 and P2 is effective to bring the piston 153 toward the right-hand side against the tension of the spring 161. An excess of the oil pumped into the left-hand chamber 158 is led through the pipe 160 and the open valve 157 into the sump 150 together with the oil from the right-hand chamber 155. The displacement of the piston rod 154 toward the right releases the brake spring 165, and the parking brake is deactuated. During the period from the instant the vehicle is permitted to move to the instant it is stopped, the logic circuit consistently retains this condition. Upon the vehicle stopping, the hydraulic system restores the brake to its original braking condition.

The arrangement of FIG. 7 further includes a novel lighting system for extinguishing headlight lamps 166 and 167 and simultaneously lighting spot light or parking light lamps 168 and 169 automatically upon the vehicle stopping, doing this in synchronism with the actuation of the parking brake. A battery 170 for the energization of the lighting circuits is in series with a light switch 171 that can be closed and opened manually. At the opposite sides of the upper end of the brake rod 163 are provided a pair of movable contacts 172 and 173 for engagement with a pair of fixed contacts 174 and 175 that are in series with the battery 170.

The switch 171 is closed before driving the vehicle. As long as the vehicle is stationary, the parking brake is actuated with the brake rod 163 being canted clockwise to hold the contacts 175 against the contacts 173, thereby causing the spotlight or parking lamps 168 and 169 to light and keeping headlight lamps 166 and 167 dark. When the parking brake is deactuated, the brake rod 163 is canted clockwise to close the contacts 174 against the contacts 172, thereby extinguishing the spotlight or parking lamps 168 and 169 and lighting the headlight lamps 166 and 167. When the vehicle is brought into a parking condition, again, the headlights are automatically extinguished and the spotlights or parking lights are put on.

In FIG. 8, I further disclose that the hydraulic brake applicator of any conventional service brake system can also be used for parking brake purposes when controlled by the logic system described. In this figure, an electromagnetically controlled hydraulic valve 180 is shown as having an oil pipe connected with a master cylinder of ordinary automobile foot brake system, generally indicated as MC, and an oil pipe is connected with the hydraulic brake units, generally shown as HB, which are provided at some or all of the vehicle wheels. The valve 180 is designed to close when no signal is received by the control coil 12 and to open when a signal is received. For this control coil 12 use may again be made of any of the devices shown in FIGS. 1 to 4 or their modifications. Thus, it will be observed that during the "go" mode, i.e. in a condition that an engine is accelerated or that the vehicle is in displacement with the engine accelerated or decelerated, the valve 180 is always open, and oil can thereby be fed forward and back freely through this valve, so that the application and release of foot brake can properly be carried out. Upon bringing the vehicle to a complete stop, by the application of the foot brake, the valve is automatically closed in response to the absence of a signal from the control coil 12, and the oil fed into the hydraulic brake units HB by the application of foot brake is kept from flowing back to the master cylinder MC and continues to operate the brake. This situation indicates that the parking brake is actuated, and it is not permitted to release until the "go" logic signal is again applied to the coil 12.

The invention described is believed to admit of many modifications within the ability of persons skilled in the art, all such modifications being considered within the spirit and scope of the appended claims.

I claim:

1. A method of automatically deactuating a parking brake that has been actuated to hold stationary an engine driven automotive vehicle provided with said parking brake separately from an operator's manipulated main brake for the movement control of and stopping the vehicle at the operator's will, said parking brake being actuated once the vehicle is brought to a stop irrespective of whether or not said engine is in operation, said method comprising the steps of bringing said engine into operation while holding said parking brake actuated, accelerating the operation of said engine for an intended start of said vehicle, detecting said acceleration and generating an electric signal indicative of said acceleration, and rendering said parking brake deactuated in response to said signal.

2. A method of automatically deactuating a parking brake for an engine driven automotive vehicle comprising the steps of bringing the engine into operation, accelerating the operation of said engine for an intended start of said vehicle, generating a signal indicative of said acceleration, and rendering said brake deactuated in response to said signal, said signal being an electric signal substantially proportional in magnitude to the revolution speed of said engine and said brake being deactuated when said signal is in excess of a predetermined level as a result of the acceleration of said engine.

3. A method defined in claim 2 wherein said predetermined level is that which corresponds to an idling speed of said engine.

4. A method of automatically actuating a parking brake for an engine driven automotive vehicle, said brake having been deactuated by the steps of bringing the engine into operation, accelerating the operation of said engine for an intended start of said vehicle, generating a first signal indicative of said acceleration, and rendering said brake deactuated in response to said signal, said method comprising the steps of detecting a second signal indicative of motion of said vehicle, and rendering said brake actuated when said second signal indicates that the vehicle has stopped.

5. A method defined in claim 4 wherein said second signal is an electric signal substantially proportional in magnitude to the speed of said vehicle and said brake is actuated upon drop of said second electric signal to substantially null level.

6. A system for automatically operating a parking brake for an automotive vehicle driven by an acceleratable engine which comprises first sensing means operatively associated with said acceleratable engine for generating a first signal in response to the acceleration of said engine, second sensing means adapted to respond to the movement of said vehicle for generating a second signal indicative of said movement of the vehicle, a brake applicator mechanism for said brake, and control means for said applicator mechanism operatively associated with said first and second sensing means for rendering said brake applicator mechanism effective to deactuate said brake upon and during receipt of at least one of said signals and for rendering said brake applicator mechanism effective to actuate said brake upon and during the absence of both said signals.

7. A system as defined in claim 6 wherein said control means includes a voltage source, switching means and load impedance such that when said switching means is closed responsive to at least one of said signals said impedance is energized to render said brake applicator mechanism effective to deactuate said brake.

8. A system as defined in claim 7 wherein said brake applicator mechanism includes a reversibly driven electric motor providing the actuation and deactuation of said brake, and said load impedance is a relay coil adapted to govern the operation of said motor.

9. A system as defined in claim 7 wherein said brake applicator mechanism includes a hydraulic arrangement having an electromagnetically controlled valve for effecting the actuation and deactuation of said brake and said load impedance is a control coil for said valve.

10. A system as defined in claim 6 wherein said first sensing means includes a sensing coil receiving an electric signal as said first signal substantially proportional in magnitude to the operation speed of said engine and said second sensing means includes a second sensing coil adapted to receive a second electric signal as said second signal substantially proportional in magnitude to the rotation of wheels of said vehicle.